G. PEISELER.
FILE AND RASP CUTTING MACHINE.
APPLICATION FILED MAR. 1, 1905.
943,993.
Patented Dec. 21, 1909.
8 SHEETS—SHEET 3.
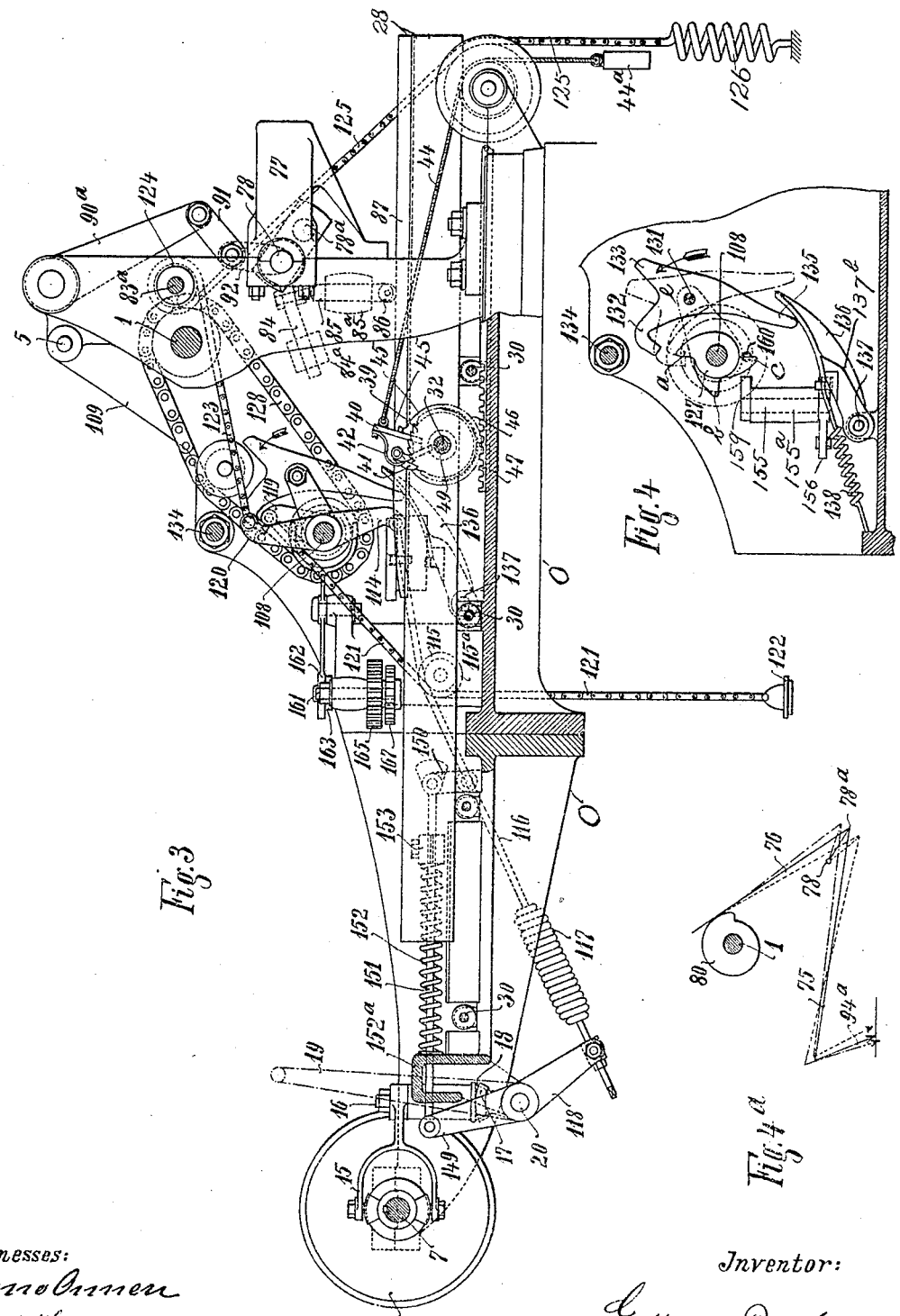
Witnesses:
Onno Onnen
Ernst König
Inventor:
Gottlieb Peiseler G. PEISELER.
FILE AND RASP CUTTING MACHINE.
APPLICATION FILED MAR. 1, 1905.
943,993.
Patented Dec. 21, 1909.
8 SHEETS—SHEET 4.
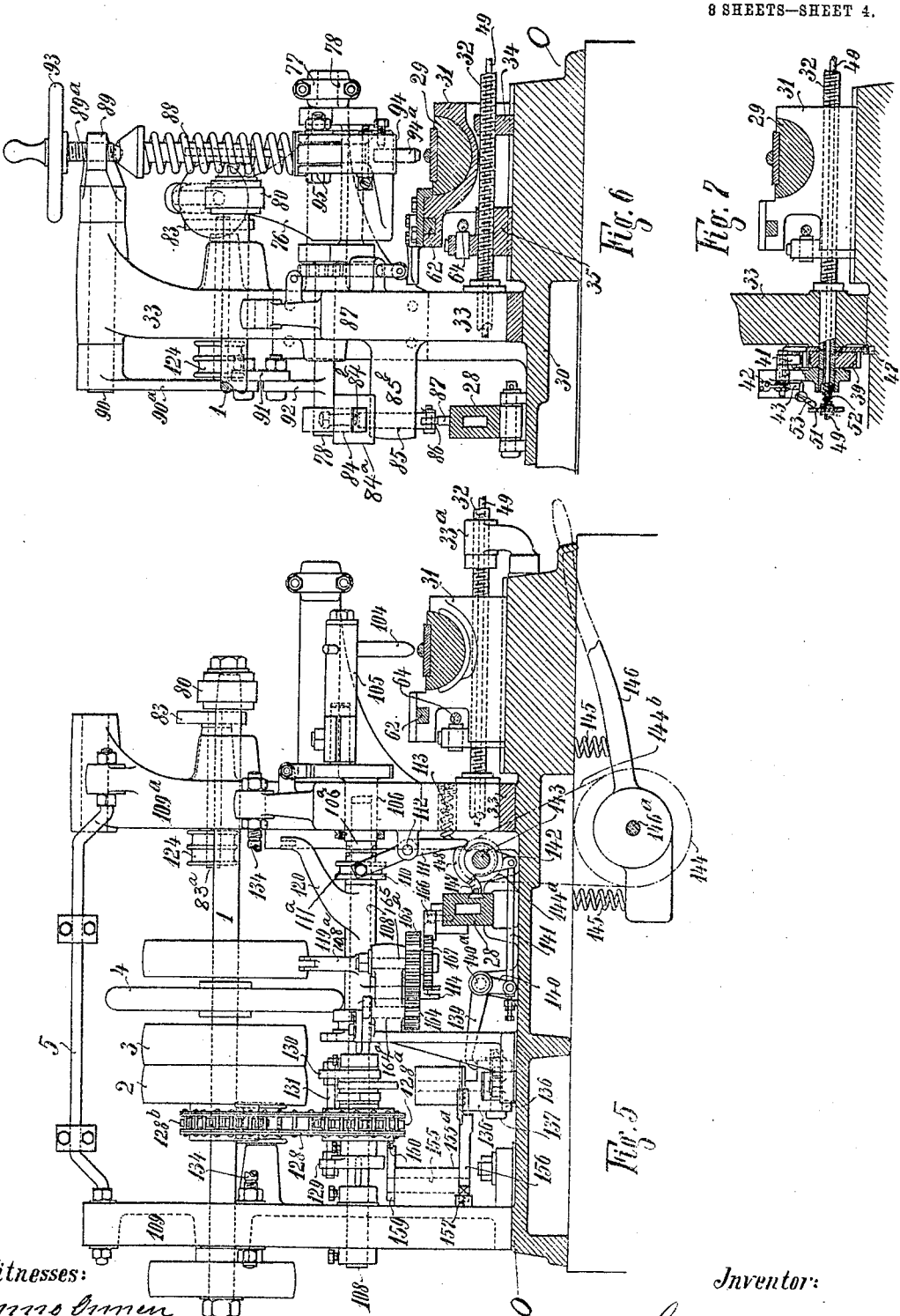
Witnesses:
Inventor:
Gottlieb Peiseler

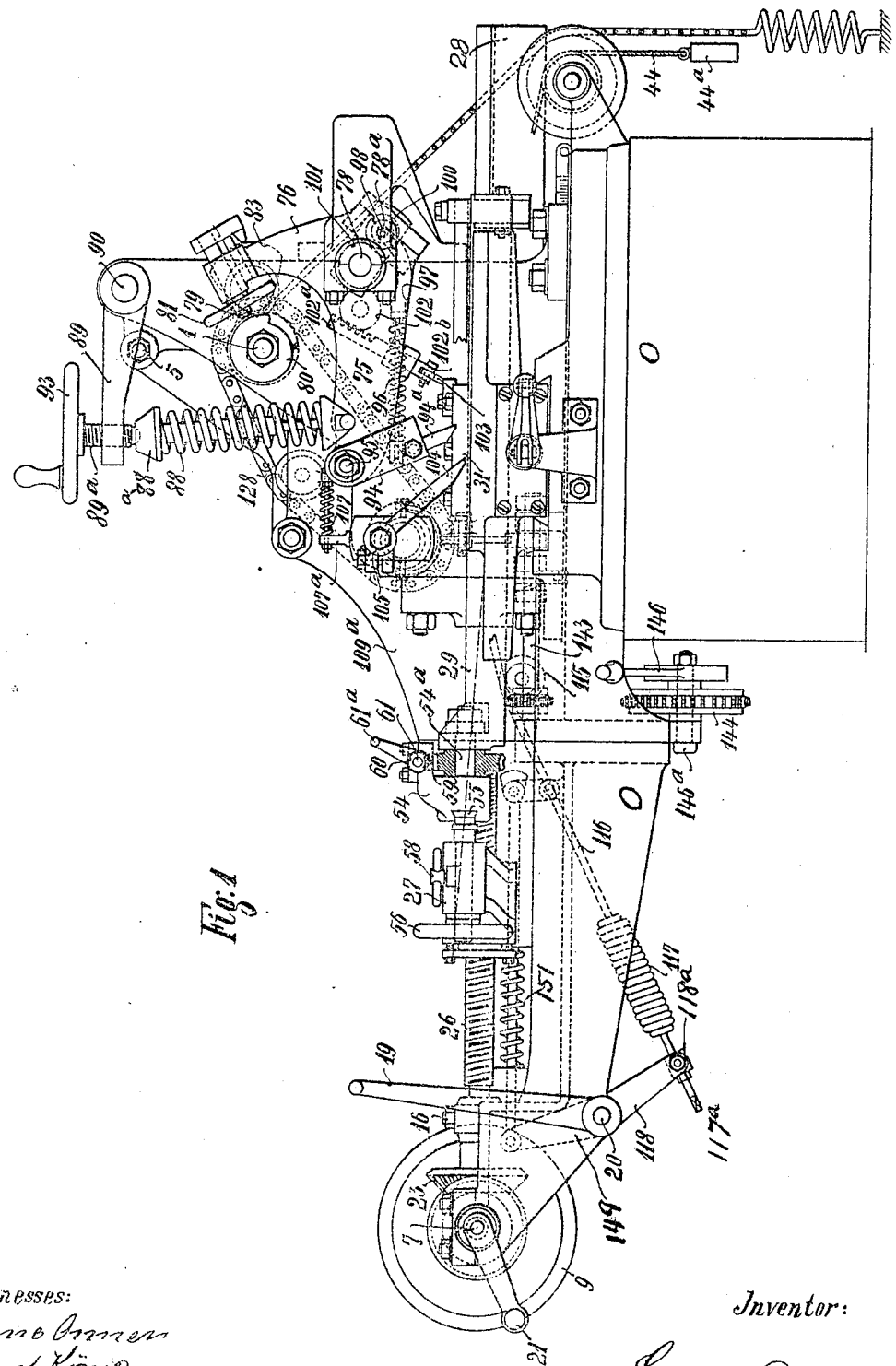

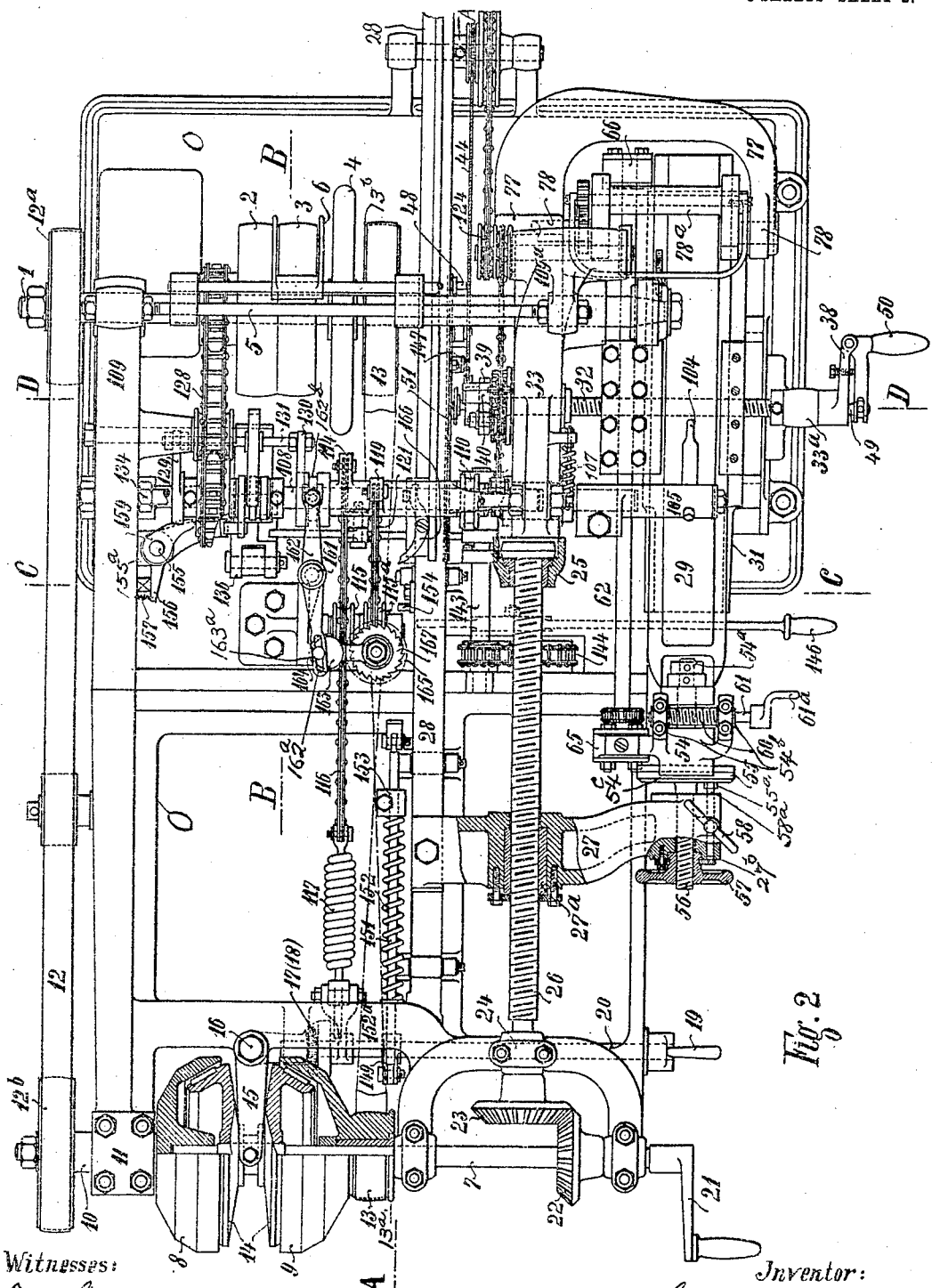

G. PEISELER.
FILE AND RASP CUTTING MACHINE.
APPLICATION FILED MAR. 1, 1905.

943,993.

Patented Dec. 21, 1909.
8 SHEETS—SHEET 5.

Witnesses:

Inventor:

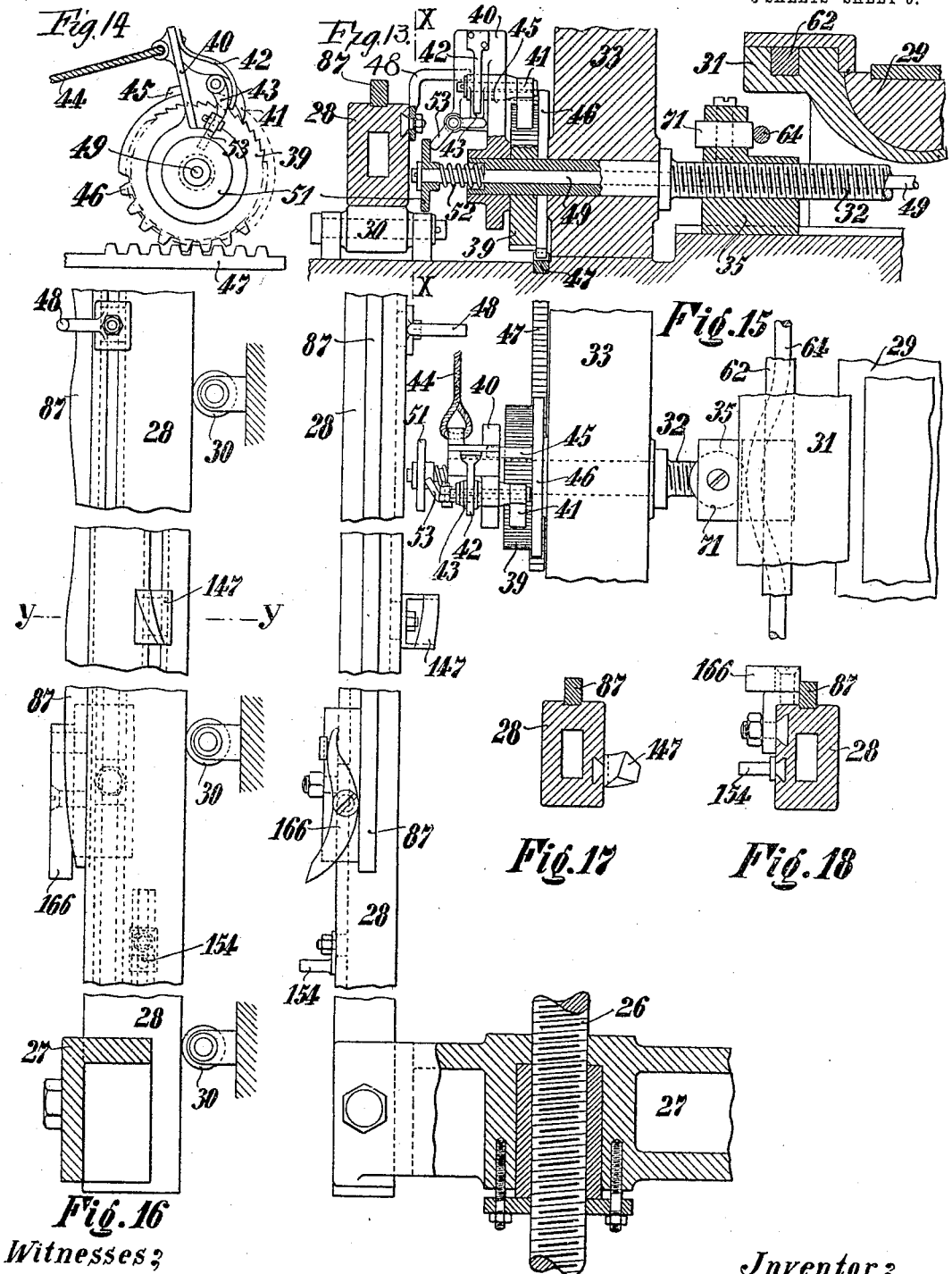

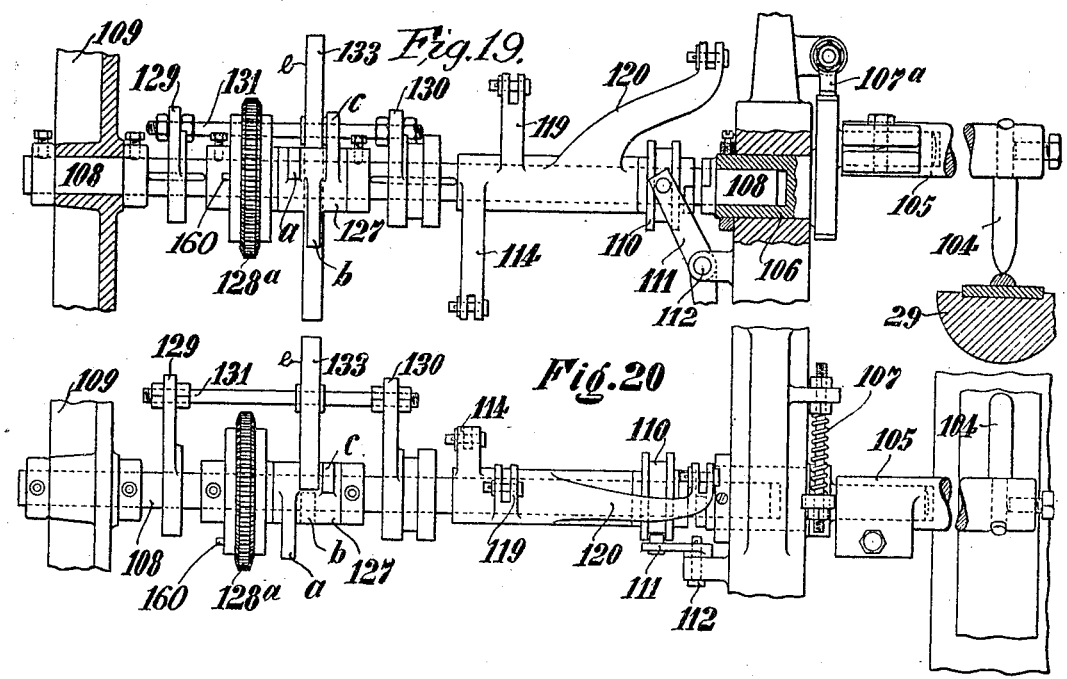

G. PEISELER.
FILE AND RASP CUTTING MACHINE.
APPLICATION FILED MAR. 1, 1905.

943,993.

Patented Dec. 21, 1909.
8 SHEETS—SHEET 8.

Witnesses:
James C. Babcock
C. T. Babcock

Inventor:
Gottlieb Peiseler
by W. H. Babcock
Attorney

UNITED STATES PATENT OFFICE.

GOTTLIEB PEISELER, OF CHARLOTTENBURG, GERMANY.

FILE AND RASP CUTTING MACHINE.

943,993.     Specification of Letters Patent.     Patented Dec. 21, 1909.

Application filed March 1, 1905. Serial No. 247,871.

*To all whom it may concern:*

Be it known that I, GOTTLIEB PEISELER, a citizen of the German Empire, residing at Charlottenburg, in the Province of Brandenburg and Kingdom of Prussia, have invented certain new and useful Improvements in File and Rasp Cutting Machines, of which the following is a specification.

This invention relates to mechanism for making files and rasps, and consists in the construction and combination of parts hereinafter more particularly set forth and shown.

The word "file" is used herein to denote a hard-abrading implement, having its working surface or surfaces ridged to form cutting edges or teeth, which may vary in closeness and need not be continuous. The word "rasp" is used herein to denote an implement resembling a file, but having coarse pyramidal projections instead of cutting teeth.

Figure 8:
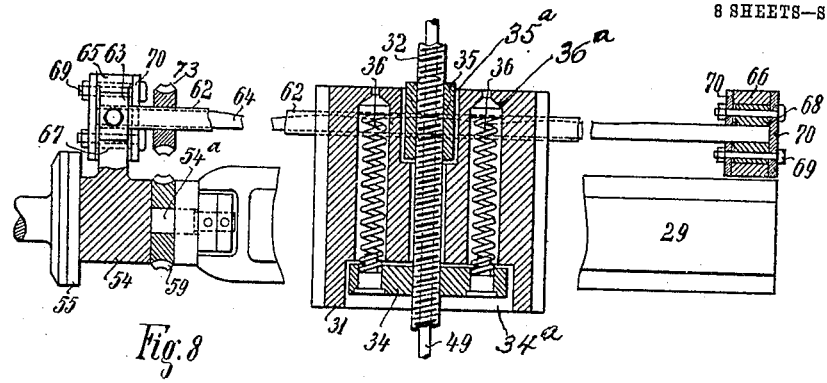
Figure 9:
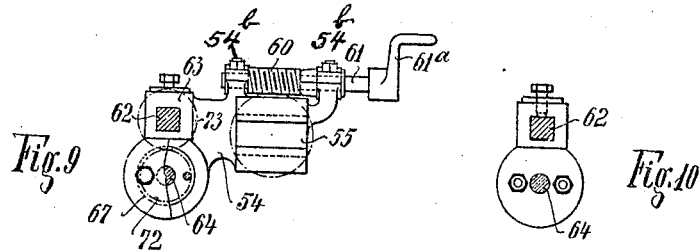
Figure 10:
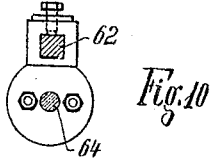
Figure 11:
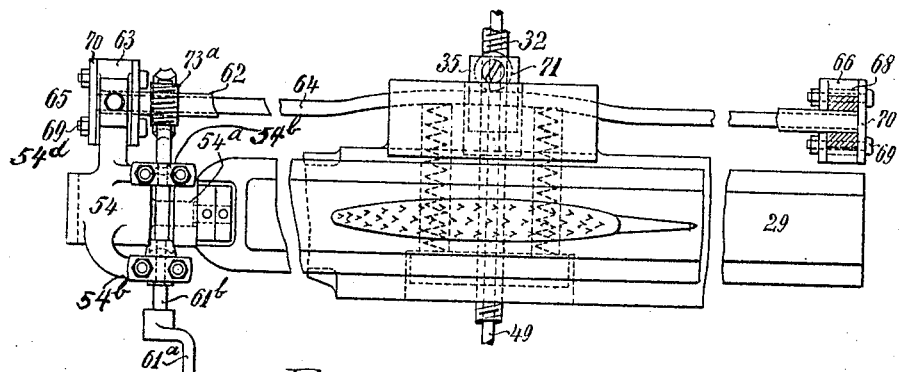
Figure 12:
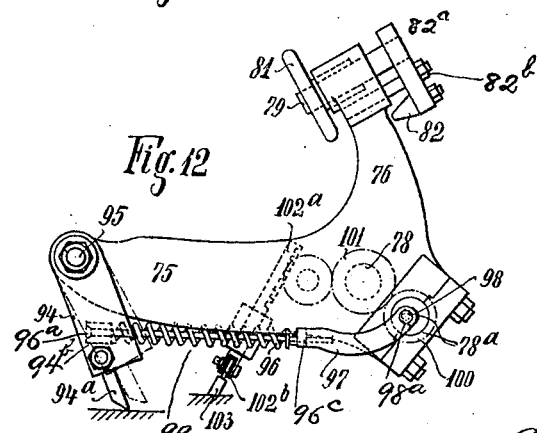
Figure 21:
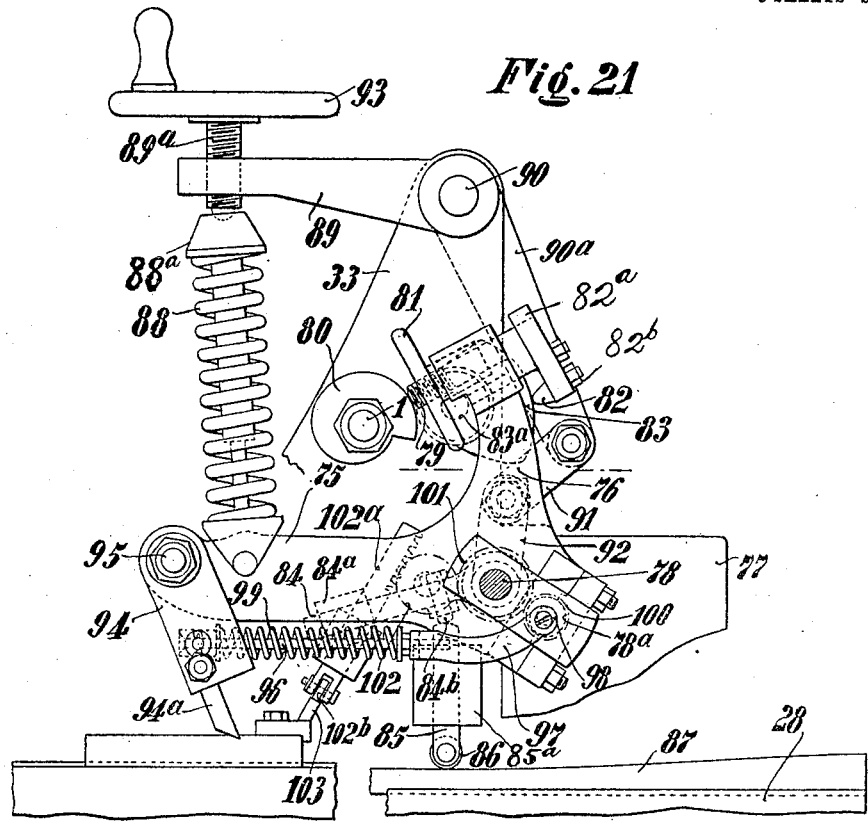
Figure 22:
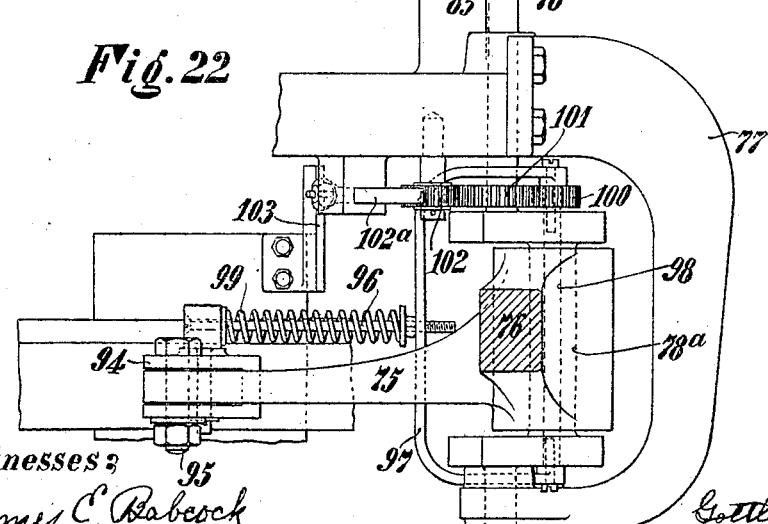

In the accompanying drawings, Figure 1 represents a side elevation of a machine embodying my invention; Fig. 2 represents a plan of the same; Fig. 3 represents a longitudinal vertical section on the line A—A of Fig. 2; Fig. 4 represents part of a similar section on line B—B of Fig. 2; Fig. 4ª represents diagrammatically the movements of the chisel; Fig. 5 represents a vertical cross-section on line C—C of Fig. 2; Fig. 6 represents a part of a similar section on line D—D of Fig. 2; Fig. 7, represents a detail view, partly in elevation and partly in vertical section, of the devices for transversely shifting the blank carrier, showing some proximate parts; Fig. 8 represents a detail view of the cross-slide, blank-carrier and appurtenances, partly in plan, partly broken away and partly sectioned; Fig. 9 represents an end elevation partly in cross-section, of the devices at the rear end of the blank carrier, showing in side elevation the transverse shaft 61 (also shown in Fig. 2) for adjusting said carrier axially, this shaft not being adapted to turn the axially adjustable governing bar or pattern bar; Fig. 10 represents a detail vertical cross section of a part of Fig. 11 taken near the left end of the latter, looking outward; Fig. 11 represents a plan view of the blank carrier and appurtenances, partly broken away and sectioned, provided with shaft 61ᵇ and gear 73ª for turning the said pattern bar; Fig. 12 represents in detail side elevation the chisel, the stock and lever carrying them, with some appurtenances; Fig. 13 represents a detail vertical transverse section (partly in side elevation) of the cross-slide on the plane of the axis of the latter; Fig. 14 represents a detail view in side elevation of the rack 47, pawl 42 and intervening parts; Fig. 15 represents a plan, partly in horizontal section, of a part of said cross-slide and pattern bar, especially illustrating the elements sectioned in Fig. 14; Fig. 16 represents a side elevation of the subject matter of Fig. 15; Fig. 17 represents a detail cross-section through parts 28 and 87 on the line y—y of Figs. 15 and 16; Fig. 18 represents a similar view, the section being taken near part 166; Fig. 19 represents in detail elevation, partly sectioned, the rack shaft with the hubs and levers for pressing down and releasing the finger which holds the file-blank on its bed; Fig. 20 represents a plan view of the devices shown in Fig. 19; Fig. 21 represents in detail elevation the chisel-operating lever and its accessories and Fig. 22 represents a plan view of the subject matter of Fig. 21. Figs. 8 to 12 inclusive are considerably enlarged from the scale of the preceding figures and Figs. 13 to 22 inclusive are enlarged still more.

The main shaft 1 of the machine is provided with a fast pulley 2, a loose pulley 3 and a hand wheel 4. A cross-bar 5, parallel to and above it, is supported by standards 109 and 109ª, which are parts of the machine frame 33 having base 0. Along this cross-bar, a belt-shifting guide 6 is movable in either direction for gearing and ungearing the driving mechanism. The said main shaft drives a parallel shaft 7 at the opposite end of the machine (see Figs. 1 and 2) in either direction of rotation at will, by means of a straight belt 12, for feeding the blank forward, and a cross-belt 13, for returning said blank. The pulleys of the straight belt are marked 12ª and 12ᵇ, the latter being mounted on a tubular shaft 10, turning in a bearing 11 fixed to frame 33. Shaft 10 affords a bearing for one end of a shaft 7, these two shafts turning independently of each other. A hollow cone 8, carried by and turning with the tubular shaft 10, presents its concavity inward and is one element of a double clutch for reversing motion. A similar cone 9 arranged in reverse position opposite to cone 8, is free to turn on shaft 7. The driven pulley 13ª of a belt 13 is integral with cone 9, said belt also fitting on pulley 13ᵇ of main shaft 7. A double cone 14 is splined on shaft 7 between the hollow cones 8 and 9 and presents its convex faces outward in opposite directions toward the concave faces of said hollow cones. A shifting lever 15 moves this double cone into engagement with one hollow cone or the other, for reversing motion. Said lever is pivoted to frame 33 at 16 and operated by gear segments 17 and 18, shaft 20 and hand lever 19, Figs. 2 and 3. Instead of being driven by shaft 1, the shaft 7 may be turned by its handle 21.

The rotary motion of shaft 7 is transmitted by gears 22 and 23 to a screw-threaded shaft 26 journaled in fixed bearings 24 and 25, which prevent it from moving endwise. A bracket 27 is mounted movably on shaft 7 and contains an internally screw-threaded bushing 27ᵃ, which is a nut traveling on a screw-threaded part of said shaft; the direction of travel of said nut and bracket along said shaft, being determined by the direction of the rotation of the latter. Said bracket is connected to, and carries with it in such travel the governing slide 28, running over rollers 30 (Fig. 16). By reason of intervening parts hereinafter described, the blank-carrier 29 shares the reciprocating motion of said governing-slide and bracket longitudinally of the machine.

The chisel 94ᵃ is held at one point above the blank on the carrier and brought down at the proper moment into operative contact therewith, making a row of file teeth or rasp teeth on said blank during the longitudinal forward movement of the latter. To provide for shifting the blank laterally, into position for thus making a second or any successive row the blank-carrier 29 is mounted on a cross-slide 31, having in its opposite sides nuts 34 and 35, engaging screw-threaded transverse shaft 32, mounted in bearings of the machine frame 33. Shaft 32 may be turned by its bell-crank handle 50 (Fig. 2), pivoted on a fixed sleeve 33ᵃ of this shaft, thus by hand shifting the cross-slide blank-carrier and blank laterally as desired. To effect the same shifting automatically, the screw-shaft 32 is provided with a ratchet-wheel 39, fixed thereon and engaged by a spring-pressed, pivoted pawl 41, which is carried by a lever 40 (Figs. 13 and 14), said lever being arranged for contact with a finger 48 on said governing slide 28, when the latter, having reached the end of its forward movement, begins to return. This finger is adjustable longitudinally of said governing slide to increase or decrease its action on lever 40 and thereby regulate the interval between the rows of teeth of the file or rasp. As another automatic means of such regulation, which may be used independently or combined with the adjustment last above described, I provide a pinion 46 (Figs. 13, 14 and 15), which turns freely on shaft 32 in proximity to said ratchet wheel 39, a rack 47 engaging said pinion and longitudinally movable in a groove of frame 33, and a stop 45 on the side of said pinion arranged to limit the movement of said lever, which is normally held against said stop by a weight 44ᵃ and cord 44. This stop constitutes the starting point of the operative vibration of said lever, when the latter is struck by the finger on the governing slide as above stated. By moving the rack 47 endwise, the extent of such operative movement of the lever is regulated at will.

The nuts 34 and 35 above mentioned are set into recesses 34ᵃ and 35ᵃ of opposite sides of the cross-slide (Figs. 8 and 11) and prevented from turning therein. Springs 36, also set into recesses 36ᵃ of the said cross-slide bear against nut 34 at one end and against said slide at the other, cushioning the said slide to spare the screw threads of the nut and shaft and other delicate parts. The points to which nuts 34 and 35 are adjusted on screw-shaft 32 with relation to each other determine the amount of play of the said slide on said shaft between said nuts against the resistance of these compressible springs. Fig. 11 shows these nuts adjusted to permit more play of said slide than would be permitted by the arrangement shown in Fig. 8.

The lateral shifting or feeding of the cross-slide 31, as hereinbefore mentioned, is mainly caused by the engagement of shaft 32 with nut 34, whereby the turning of said shaft in the proper direction forces nut 34 against the said springs and transmits pressure to said slide through them, or directly to it from the face of said nut, if the latter reaches the bottom of the recesses 34ᵃ by compressing said springs. When the screw shaft 32 is turned reversely for restoring said cross slide 31 to its first position, after all the file teeth or rasp teeth have been cut on the blank, this movement draws the nut 35 against the said slide, carrying it along as desired. This action would occur if nut 35 were integral with said slide; but a separate nut may be more conveniently replaced or repaired when worn. Whichever way the slide is shifted, the nuts 34 and 35 maintain their relative position during operation, being equally acted on by the screw-threads of shaft 32. To adjust their relative position, either one of them may be turned bringing it nearer to or farther from the other. The springs 36 do not show in the views illustrating the entire machine or in some others, being hidden by intervening parts.

The blank carrier 29 is a bar or elongated block made flat on top and slightly recessed to receive the file blank, but convex on its under side and fitting (Figs. 5, 6, 7 and 14)

into a similarly shaped concave recess of the cross-slide 31, these parts having in cross-section the curvature of an arc of a circle, in order that said blank carrier may be adjusted axially to compensate for the convexity of a rounded file blank and present the surface of the latter properly to the chisel, thus keeping the rows of file teeth properly alined, while insuring a proper backing to said blank carrier. This axial adjustment is effected by means of a shaft 61 (Fig. 9) arranged transversely to the cross-slide 31 and blank carrier 29 and turning in bearings 54$^b$ of a terminal bracket 54, which is provided with a stud 54$^a$ clamped detachably to one end of said blank-carrier. A worm-wheel 59, fixed on said stud, engages from below a worm 60 (Figs. 2 and 9) on said shaft, so as to be turned thereby, correspondingly turning with it the blank carrier. Of course the direction and extent of such movement will be governed by the axial movement of adjusting shaft 61. A very slight turn of handle 61$^a$ suffices.

The bracket 54 and blank carrier 29 are adjusted longitudinally by means of a screw-shaft 56 and its adjusting nut 57, the proximate parts of said screw-shaft and bracket engaging by means of overlapping parts 54$^c$ and 55, so that the endwise movement of said screw-shaft may be duly transmitted to said blank carrier. Said screw-shaft passes through a bracket or subsidiary frame 27 and is supported thereby. This longitudinal adjustment by hand is of course independent of any of the other adjustments or movements hereinbefore described. The blank carrier and attached parts may be locked in any position of such longitudinal adjustment by a bolt 58$^a$, which is adapted to slide through a passage 27$^b$ of bracket 27 and engages a recessed boss 55$^a$ of plate 55 which is a part of bracket 54 as above stated. A clamping screw 58 passing through a part of bracket 27 and engaging the same enters the side of said passage 27$^b$ and bears by end pressure against the side of said bolt, locking the same.

To permit the tubular screw-shaft 32, as above, to turn reversely for restoring the blank carrier to its original position, the pawl 41 must first be disengaged from ratchet wheel 39. This is preferably done by means of a rod 49, movable longitudinally within said shaft and loosely connected at its outer ends to the proximate bell-crank arm of pivoted handle 38 before mentioned. The other end of said rod is provided with a disk or head 51, normally held by a spring 52 out of action on an arm of bell-crank lever 53, pivoted on lever 40 before mentioned. When handle 38 is operated so as to move rod 49 longitudinally and thus bring said disk or head against said arm, lever 53 is thereby turned on its pivot, causing its other arm to operate a counter-pawl 43 (Figs. 7, 13 and 14) which frees pawl 41 from the ratchet wheel 39.

During the lateral movement of the cross-slide and blank carrier the engaging and overlapping parts 54$^c$ and 55 before described act as guides therefor, these parts being open at the sides and interlocking longitudinally only.

To make rasp teeth or file teeth in undulating lines or any other lines except straight ones, I use for automatic lateral movement of the cross-slide 31 and the tool carrier and tool on said slide a rotatable pattern bar 64, so bent or otherwise deformed in a predetermined and calculated way, as to produce by its changes of axial position the effect desired. This bar is journaled in bearings 67 and 68, the former being on an arm 54$^d$ of bracket 54 and the latter bearing being carried by a prismatic non-rotary rod 62 arranged above and parallel to the geometrical axis of said pattern bar 64, said bar being mounted in a lug 63 of said bracket and a similarly raised piece of said cross-slide (Figs. 5, 6, 7, 8 and 13). The straight cylindrical ends of the said pattern bar are held in place by caps 70 and their screws 69. The curved middle part (as shown) of said pattern bar is held in contact with a roller 71 on nut 35, so that while the blank-carrier 29 and cross-slide 31 are moved longitudinally of the machine the lateral curvature of the rotary pattern bar 64 compels a corresponding cross movement of said slide and carrier, so that the incisions of the chisel, forming the file teeth or rasp teeth, will be made in the face of the blank in correspondingly curved longitudinal lines. The springs 36, by their pressure against nut 34, which is transferred to screw-shaft 32 and thence to nut 35, keep the said roller 71 in contact with said pattern bar, whatever the axial position of the latter. This pattern bar is provided with a fixed gear wheel 72, engaging a loose gear wheel 73 on prismatic rod 62 (Figs. 8 and 11). In order to axially turn the said pattern bar, a shaft 61$^b$, shown in Fig. 11, may be substituted in bearings 54$^b$ for the shorter shaft hereinbefore described and shown in Figs. 3 and 9. The handle 61$^a$ is retained for shaft 61$^b$, but the worm 60 is dispensed with, another worm or other suitable gear-wheel 73$^a$ being substituted. This gear 73$^a$ is located on the operative end of shaft 61 beyond the inner bearings 54$^b$, in position to engage gear-wheel 72, and through it drive wheel 73 and pattern bar 34 as said handle and shaft are turned gradually by hand. Of course the longer shaft 61$^b$ and gear 73$^a$ are not needed when a blank is to be provided with teeth in straight lines, and the shorter shaft 61 and gear 60 are useless for producing curved lines of the teeth; hence these shafts and their appropriate worms or other gear wheels 73ª and 60 are alternatives—only one being in use at a time. But they differ only in the respects stated and the same bearings receive them.

The chisel or cutting tool 94ª is downwardly presented by a stock 94, pivoted to the end of the nearly horizontal arm 75 (Figs. 1, 6, 12 and 21) of a bell-crank lever mounted on the crank 78ª of a crank shaft 78 journaled in bearings 77 of the machine frame. The strokes of said chisel are given by a powerful spring 88 (Figs. 1 and 21), which bears down on the operating arm 75 of said bell-crank lever. The said chisel is lifted by a cam 80, carried by main shaft 1, and acting against the end of a rod 79, which passes transversely through the upright arm 76 of said bell-crank lever, an adjusting nut 81 on the screw-threaded inner end of said rod coming in contact with the said arm and causing it to move with said rod and rock on its pivot at each impulsion of said cam. This movement, by lifting arm 75, compresses spring 88, which acts in its turn as stated, thus providing a regular pivotal reciprocation of said bell-crank lever, with strokes of said chisel or tool at predetermined intervals. By turning nut 81 to make the end of rod 79 near the cam protrude more or less toward the latter, the periods of such strokes and the intervals between the individual file teeth or rasp teeth in a row may be increased or lessened. By turning the crank-shaft 78, the crank 78ª, on which said bell-crank lever is pivotally mounted, may be raised or lowered obliquely, thus adjusting both the inclination of the chisel and the depth of the cut, and consequently the shape and size of the file teeth also. Fig. 4ª illustrates this adjustment diagrammatically. This turning may be done manually, using crank 78ª as a handle. To provide for similar adjustment automatically, I fasten on said crank a depending arm 84 (Figs. 6 and 21), providing the same with a weight 84ª and a downward projection 84ᵇ, which latter bears on a vertical rod 85, sliding in a fixed part 85ª and carrying on its lower end a roller 86 (Fig. 21), in contact with a governing bar 87 of varying thickness carried by governing slide 28. While this slide moves longitudinally of the machine the said bar acts on said roller to raise and lower the same and the parts supported thereby according to the relative thickness of the different parts of said bar which successively travel under the said roller. In consequence, by the connections above stated, the said governing bar and roller turn the crank-shaft 78 and adjust the angle and depth of the cut and the shape of the teeth absolutely according to the calculated shape of said bar. The lower end of said spring 88 is provided with a head pivoted to arm 75, to prevent undue strain as the inclination of said arm changes. A similar head 88ª (Figs. 1 and 21) at the upper end of said spring is likewise connected to the lower end of an adjusting screw 89ª, having a handle wheel 93, whereby it may be turned to vary the tension of said spring, and extending through a rigid arm 89 of a rock-shaft journaled in fixed bearings of the machine frame. A similar arm 90ª of said shaft is connected by a link 91 (Figs. 3 and 21) to a rigid arm 92 of crank-shaft 78. Consequently the said upward and downward movement of sliding rod 85, as acted on by governing bar 87, will be transmitted through said parts 84, crank-shaft 78 and said arms 92 and 90ª to shaft 90 rocking the latter and arm 89 (Fig. 21) so as to slightly press down screw 89ª or slightly raise the same, thus automatically varying the tension of spring 88 according to the shape of said governing bar, irrespective of the manual adjustment of said screw and spring above stated, the latter being chiefly useful to compensate for wear or weakening or to adapt the machine to lighter or deeper cutting at will. By the governing bar as above explained I automatically and simultaneously strengthen or weaken the stroke of the chisel and regulate the angle and length of said stroke.

As shown in Figs. 12 and 21, the adjustable rod 79, which receives on one end the pressure of cam 80, has at the other end an arm 82ª guided by a rod or bolt 82ᵇ and carrying a conical finger 82 parallel with said bolt and with said rod 79. This finger receives the impact of a rotating cam 83 which operates by its pressure on said finger to hold the rod 79 out of reach of cam 80 during a brief part of each rotation of cam 83.

A rod 96 (Figs. 12 and 21) is connected to the lower part of tool-stock 94 by the head 96ª of said rod, which head is set into a recess of said stock, said recess being large enough to allow a certain amount of play to said stock on its pivot, though preventing any motion in excess thereof. The other end of said rod is provided with a bifurcated head 97, the ends of which are attached to the studs or wrist-pins 98ª, projecting eccentrically from the ends of a short shaft 98 (Figs. 21 and 22) that passes through crank 78ª. A helical spring 99 surrounds the said rod 96, being interposed between a collar 96ᶜ of said rod and the said chisel stock 94. In making a stroke the movement of said chisel is absolutely limited by the throw of a crank 78ª. The extremes of the pivotal play of the stock 94 and chisel 94ª, while the position of said crank remains unchanged, are respectively indicated by solid and dotted outlines in Fig. 4ª. The spring 99 cushions the reaction of the blank on the chisel. This provision, with the allowance of some pivotal play, as stated, independent of the bell-crank lever which carries said stock, will approximate the yielding and adaptive quality of hand-work, thus reducing the risk of injury to the tool and blank and perfecting the result.

The short shaft 98 is free to turn in crank 78$^a$, the latter being made tubular to afford a bearing therefor. A pinion 100 (Figs. 1 and 22) fast on said shaft, meshes with a gear wheel 101 (Figs. 12 and 22) loose on crank shaft 78, and this again meshes with a pinion 102 engaging on a movable rack 102$^a$, having a supporting roller 102$^b$, which rests on a templet 103 fixed to the cross-slide 31. This templet is calculated to cause the successive inclinations of the chisel required for producing the desired pattern of file teeth, such changes of inclination depending on the varying contour of said plate, and the rising and falling motion of the said rack due thereto being transmitted as rotary or other motions through said gears 102, 101, 100 to shaft 98, wrist pins 98$^a$, head 97 and rod 96, to automatically vary the angular position of tool-stock 94 on its pivot.

The file blank is held down on the blank carrier by a finger 104 on an arm 105 of a hollow shaft 106 (Figs. 1, 2, 5, 19 and 20) journaled in a part of the machine frame 33. A spring 107 acts on a projetcing part 107$^a$ of said arm 105, to lift said finger from the blank when downward pressure on said finger is removed by uncoupling shaft 106 from rock shaft 108 as hereinafter described. The said rock shaft 108 is journaled at one end in hollow shaft 106, and at the other in a fixed part of the machine frame. The proximate end 106$^a$ of shaft 106 is toothed to form one member of a clutch, the complementary clutch member 110 being splined on shaft 108 and operated by a shifting lever 111 to couple or uncouple the two shafts at will, the engagement of this lever with the member 110 being by pin and grooved collar 111$^a$. This shifting lever is fulcrumed at 112 and a spring 113 bears on it, tending to effect such coupling. The shaft 108 has a sleeve or long hub 108$^a$ fast on it, provided with three rigid arms 114, 119 and 120. The arm 114 normally extends downward, and a chain or rope 116 attached thereto passes over a guide roller 115 (Fig. 1) to a strong helical spring 117, from the other end of which a rod 117$^a$ passes through the end of an arm 118 of shaft 20, being clamped there by a screw 118$^a$. This shaft 20, as already described, is the means of shifting the member 14 into engagement with one or the other of members 8 and 9 of the reversing double cone coupling on shaft 7, according to the direction of rotation of shaft 20. When the turning of shaft 108, coupled as above stated to shaft 106, pulls by means of arm 114 and rope or chain 116 on arm 118, in opposition to spring 117 said reversing gear will be set to move said blank carrier 29 longitudinally in one direction. Another chain or rope 121 (Fig. 3) extends from the end of the normally presented arm 119 over a guide roller 115$^a$, located beside said roller 115, down to a treadle 122 at or near the floor of the apartment. A third chain or rope 123 extends from the third arm 120 (Figs. 19 and 20), also normally raised, of sleeve or hub 108$^a$, to a roller 124 on and turning with the shaft 83$^a$ of the aforesaid cam 83 (Figs. 5, 6 and 21) for acting on the tool-carrying bell-crank lever 75 to hold the tool 94$^a$ out of work. By depressing the treadle 122 the sleeve 108$^a$ and shaft 108 will be turned so as to draw chain 123 over roller 124 and turn cam 83 to bear against the upper arm of lever 76 and thus lift the chisel 94$^a$ out of engagement with the blank. The cam 83 is held in this position of engagement with the bell-crank lever 76 by the pull of a spring 126 on another chain 125, also attached to roller 124 but operating reversely to chain 123 aforesaid.

The depression of treadle 122 by the aforesaid connections simultaneously, through described intervening devices, shifts the clutch for reversing the travel of the blank carrier and raises the chisel 94$^a$ out of operative position, while at the same time the shaft 106 is unclutched from shaft 108 as before described, and both the finger 104 and the chisel are held inoperative while the blank carrier runs back. This may be done, not only at the end of any row of teeth, but whenever the discovery of any impediment or defect makes the cessation of work and the restoring of the blank carrier to its first position advisable. It is necessary only to operate lever 111 for clutching as hereinbefore described and to depress the treadle 122, whereupon the blank and carrier are freed from all impediment and run back as described.

A hub 127 loose on shaft 108, is driven by the driving shaft aforesaid through a chain 128 and chain wheels 128$^a$ and 128$^b$ and carries three lugs $a$ $b$ and $c$, arranged at longitudinal and circumferential intervals calculated for their alternative action hereinafter described, only one of said lugs ever being in use at any one time. A pair of arms, 129 and 130, feathered on shaft 108, carry at their outer ends a cross-rod 131, on which a dog $e$ is pivoted, having three integral arms 132, 133 and 135 in the same vertical plane transverse to said shaft, but at different circumferential points. The arm 132 of said dog is hooked at its tip and adapted to engage with any one of said lugs $a$ $b$ or $c$, when said lug and said dog are in the same vertical plane transverse to said shaft 108. The weight of the said dog is so distributed about its pivot 137 that the arm 132 normally tends to drop into the position shown by dotted lines in Fig. 4, its hooked end then being in the path of rotation of the lug occupying the transverse vertical plane aforesaid. The shaft 108 turns with the hub 127 while the said arm 132 of dog $e$ is thus in contact with any of the lugs $a$ $b$ or $c$, but when said arm is held out of position for such engagement the rotation of the hub 127 and its lugs $a$ $b$ $c$ will not be transmitted to said shaft 108 and the latter remains subject only to the action of treadle 122 and chain 123.

The arm 135 of dog $e$ is arranged for normal contact with the upper side of a pivoted tapering support 136, which is acted on by a spring 138 to turn back dog $e$ on its pivot and hold its hooked arm 132 out of position for engagement with lug $a$ as shown in solid lines on Fig. 4 or with lug $b$ or $c$ if shifted into the same place. This engagement of support 136 with arm 135 and the consequent freeing of arm 132 prevent rotation of hub 127 from being transmitted to shaft 108, as above stated. But this support (except as prevented by means hereinafter described) may be depressed (see Figs. 1, 2 and 5) against the resistance of its spring 138, thereby freeing arm 135 and allowing the dog $e$ to turn on its pivot in accordance with the relative weight of its parts, as before explained, thereby bringing arm 132 into the position shown by dotted lines, for engaging one of the lugs of hub 127. To cause such depression and liberation, I employ a lever 146 fixed on a rockshaft 146$^a$ and balanced by springs, said shaft being geared to another shaft 143 by a chain 144$^b$ and chain wheels 144 and 144$^a$. This latter carries an arm 142 coupled by a rod 141 to another arm 140 having a lateral stud 140$^a$ which carries an arm 139 arranged for contact with said support 136 to depress the latter. In consequence whenever the lever 146 is suitably tilted the support 136 is depressed and the arm 132 of dog $e$ is allowed to drop into the path of one of the lugs $a$ $b$ or $c$. While said parts 132 and $a$ ($b$ or $c$) are thus in contact and the rotary motion of hub 127 is consequently transmitted through dog $e$ to shaft 108, reversing the direction, the said dog turns with said shaft until the arm 133 of said dog strikes a fixed stop rod 134 arranged in the path of rotation of said arm. The effect of this contact, which necessarily and automatically recurs at regular intervals, is in each instance to turn back the dog $e$ on its pivot and thus lift the arm 132 out of the path of rotation of any lugs on hub 127. In such circumstances there is no action of said hub on said dog or shaft and these two latter parts remain motionless. Consequently the shaft 108 is inactive during two very brief periods, namely, while the support 136 is depressed and while stop 134 is holding back the arm 133. At all other times, except when turning briefly with shaft 106, the shaft 108 turns on its axis at the same rate of speed as hub 127.

A short vertical shaft 155 (Fig. 2) turns in a bushing 155$^a$ fixed to the main frame of the machine. A lever 156 fast on said shaft has a retracting spring 157 attached to its short arm, its longer arm (Fig. 4) being normally held thereby under a part of support 136 before described, its function being to prevent the descent of the latter and the consequent freeing of arm 132 from one of the lugs $a$ $b$ or $c$ of hub 127. A rigid finder 159 of shaft 155 is struck at regular intervals by a stud 160 (Fig. 5) of the hub 127 rotating in unison with the main or driving shaft, so that with each rotation of the latter the lever 156 will be moved by said stud to momentarily free the said support. Only during the moment of contact between said stud and finger can the arm 132 of dog $e$ fall into the position of engagement indicated by dotted lines in Fig. 4; because only at that moment will support 136 be free to yield to the depressing action of lever 139 as this latter is periodically applied. In short, these two periodical automatic actions of depression and withdrawal of support must exactly coincide to relieve the dog $e$ from the action of support 136 in holding arm 132 out of action. The regular periodicity of alternate engagement and releasing of the said dog insures accuracy in the positioning of the moving parts of the machine and their perfect coöperation. Many of these parts being small and the machine as a whole complex there may be looseness due to wear, but the brief pause of a part of the machine automatically started again will compensate therefor, permitting the moving parts to take their exact positions and perform their functions precisely.

The machine would be operative, with this last mentioned improvement, if there were only lug $a$ on hub 127. But by increasing the number of said lugs and arranging them at different circumferential points, I am able to give greater variety to the arrangement and designs of the file teeth. Thus in order that the individual files of adjacent parallel rows should be arranged alternately or in break-joint fashion it is necessary to engage arm 132 first with lug $a$ and afterward with lug $c$, these lugs being at points 180° apart on the circumference of the hub 127. These lugs being also at longitudinal points of the hub 127 it becomes necessary to shift said lug $e$ from point to point along said shaft. This is effected by means of lever 162 (Fig. 2) fulcrumed at its middle on a vertical stud 161 and actuated by a disk 163 and its crank-pin 163$^a$, which pin enters a longitudinal slot 162$^a$ in one end of the said lever. This disk turns with its short vertical shaft 164ª (dotted lines Fig. 5) having pinion 164 fast thereon engaging gear wheel 165 of a shaft 165ª. This latter shaft has a fast ratchet wheel 167 in the path of a pawl 166 (Fig. 5) mounted on slide 28 aforesaid, whereby said ratchet wheel and shaft are turned to the extent of one tooth at each return movement of said slide. This axial step by step motion is transmitted through the gearing above mentioned to the crank stud 163ª and the lever 162 is turned on its fulcrum accordingly. The operating arm of this lever has (Fig. 1) a pin and groove connection at 162ᵇ with the hub of arm 130 feathered on shaft 108 as before stated. Said lever is arranged with respect thereto so that each vibration of the former moves this arm 130 and the similar connected arm 129 along the shaft 108, carrying with them the dog $e$ and shifting the hooked arm 132 from lug $a$ to lug $c$, the reverse movement of said lever carrying said arm back again. As lug $c$ acts on said arm later than lug $a$ by one half a revolution it follows that each tooth of one row of the files will be exactly opposite the middle of the interval between two teeth of the adjoining row. The throw of said pawl and lever may of course be made only great enough to shift arm 132 from the path of lug $a$ to the path of lug $b$, causing a series of shorter reciprocations, the tool operating devices being suitably modified to make twice as many teeth in the same period and at half as great intervals. In either case the pin and groove connection before stated prevents binding.

Of course the middle lug $b$ is useless, but does no harm if there is no need to manufacture files having teeth of the arrangement last stated. Also if the machine is to make only files having the individual teeth of parallel rows arranged opposite each other, the hub 127 may be used with only one lug and the divices for shifting the arms 129 and 130 along shaft 108 may be dispensed with. The stop bar 134 is also not absolutely indispensable but affords an additional check and certainty of temporary cessation of the turning of shaft 108 and its action on the blank feeding mechanism and cutting mechanism, thus allowing another opportunity for any small loose parts to reach their proper position and do their work. While hub 127 and shaft 108 are disconnected by the action of this stop bar on dog $e$, the shaft 108 is prevented from accidentally turning backward by the pressing finger 104, the springs 117 and 126 being in tension and balanced and all the parts held in proper position thereby. But the depression of treadle 122 will free the shaft and other elements from the resistance of finger 104 and turn the said shaft backward or in the direction opposite to that indicated by the arrow in Fig. 3 and thus return the said shaft to a position for effectively moving forward again. The hub 127 mounted on said shaft rotates continuously with the main shaft 1, but shaft 108 does not complete a rotation. It is properly a rockshaft moving forward from its most rearward position in the direction of rotation until briefly checked by the automatic action of spring pressed support 136 on arm 135, then promptly relieved by the depressing action on said support hereinbefore described and again moving forward by reason of the reestablished engagements between parts 132 and $a$ (or $b$ or $c$) until its arm 133 strikes stop rod 134 and these parts are again disconnected, then thrown back to its first position by the action of treadle 122 and connections, to begin the same journey over again.

The stop rod 134 is shown fastened by nuts and of course may be easily removed at will. This would dispense with the necessity for turning it back and would enable it to complete the rotary movement, but would also discard the advantage of temporarily checking the shaft 108 and parts actuated thereby, which check as heretofore stated enables loose and lagging parts to catch up and work perfectly. In such circumstances the machine would have to depend entirely on the support 136 and coöperating parts for such compensation.

For automatically releasing the blankholding finger and the tool at the forward end of a row of file teeth and permitting the blank to travel back and take a position for cutting a second row, the governing slide 28 is provided with a lateral horn or projection 147, which travels with the longitudinal movement of said slide under and in beveled contact with the lower end of a segmental rib 148, formed on a hub which is freely mounted on shaft 143; the said projection thereby turning the said hub and pressing the other end of the said rib (Fig. 5) against the coupling lever 111 of shafts 108 and 106; whereby the latter and the finger holder 105 are freed, and the finger 104 automatically removed from the file blank by the action of its spring 107 as before described. The spring 126, drawing on chain 125 and hub 108ª (Fig. 5) as before stated, then turns the cam 83, tilting the bell crank lever 75 out of reach of its operating cam 80 and holding the chisel 94ª out of contact with the blank; and by the same pull on the hub 108ª and its arms and connections, the relatively movable member 14 of the reversing double cone gear hereinbefore described is shifted in the direction opposite to that given by the pressure on treadle 122 as explained; consequently the shaft is turned reversely and the blank carrier 29 is caused to travel backward to its first position.

The shaft 20 before described is provided with a rigid arm 149, extending in a direction nearly opposite to that of arm 118. The end of the former arm is pivotally connected to one end of a horizontal rod 151, arranged longitudinally of the machine, the other end of the said rod being supported by an upright link 150 pivoted between raised lugs on the main bed of the main frame. Said rod is provided with a collar 153, adjustably fixed thereon and receiving the pressure of the inner or forward end of a helical spring 152 surrounding the said rod. This spring bears at its other end against a part of the main frame, and its pressure may be adjusted by adjusting the said collar. Its tendency is of course to hold the said rod longitudinally inward, thereby holding shaft 20 so turned as to keep the clutch member 14 in engagement with cone 9 for causing the return of the blank carrier by the rotation of shaft 7 under the action of the crossed belt 13. This return action will take place as soon as the pressure finger 104 is released from the action of shaft 108 by the uncoupling of shaft 106 and the tension of spring 117 is left free to act as before described. When the blank carrier 29 has returned to its original position, a projection 154 on the governing slide 28, which moves backward with the said carrier, comes in contact with the inner end of rod 151, overcoming the resistance of spring 152 and turning the shaft 20 in the other direction, so as to free the double clutch member 14 from cone 9 and thus end the before described rotation of the shaft 7 and the rearward movement of the governing slide and blank carrier.

A short vertical shaft 155 (Fig. 2) turns in a bushing 155$^a$ fixed to the main frame of the machine and has a lever 156 of the first kind fast thereon, the shorter arm of said lever being provided with a retracting spring 157, and the other arm 156, as shown in detail in Fig. 4, being normally held by said spring under a part of support 136 before described, to lock the latter from descending below engagement with arm 135 of the aforesaid three armed locking dog $e$, the arm 132 of which dog is held by such engagement out of contact with one of the lugs $a$, $b$, or $c$ of collar $d$. A rigid lateral finger 159 of said short shaft 155, arranged above the said lever is struck by a stud 160 (Fig. 5), extending laterally from the chain wheel 128$^a$ on hub 127 aforesaid, so that with each revolution of the main shaft, the lever 156 will be moved by said stud to momentarily free the said support. Only during the moment of such contact between said stud and finger can the arm 132 of dog $e$ turn into the locking position of engagement indicated by dotted lines in Fig. 4. The periodicity of this checking and almost instantaneous releasing of the said dog insures the accuracy of the relative positioning of the moving parts of the machine and their perfect cooperation. Many of these parts being rather small and the machine as a whole somewhat complex, there might otherwise be some slight looseness due to wear or uncertain causes, but the momentary pause of a part of the mechanism will compensate therefor, permitting the moving parts to take precisely proper places and perform their functions exactly.

For making files in which the individual teeth of adjacent parallel rows are not arranged opposite each other but alternately, it is necessary to make the arm 132 of dog $e$ engage with lug $a$ during the cutting of one row of teeth and with the next lug $c$ in cutting the next row. As these lugs are 180 degrees apart on the circumference of the hub 127, the cutting mechanism will be started half a revolution later for the second row than for the first row and the teeth will be formed a corresponding distance ahead, each tooth of the second row being therefore opposite the middle of a space between two teeth of the first row and vice versa. This change is effected by means of a lever 162 (Fig. 2) fulcrumed at its middle on a vertical stud 161 and actuated by a disk 163 and its crank pin 163$^a$, which pin enters a longitudinal slot 162$^a$ in one end of said lever. This disk turns with a short vertical shaft 164$^a$ shown by dotted lines in Fig. 5, and journaled in a fixed part of the machine frame. A pinion 164 fast on this shaft meshes with a gear wheel 165 fast on a similar shaft 165$^a$, likewise journaled and provided with a fast ratchet wheel 167 in the path of a pawl 166 (Fig. 5), mounted on a governor slide 28, said ratchet wheel being thereby turned to the extent of one tooth on each return movement of the said governing slide, which axial motion is transmitted through the gearing above mentioned to the crank stud 163$^a$, and the lever 162 is turned on its fulcrum accordingly. The operating arm of this lever, on the other side of the fulcrum from said crank pin carries (Fig. 2) a downwardly projecting pin entering a groove 162$^b$ of the hub of arm 130, mounted on shaft 108 in proximity to hub 127 aforesaid. Each vibration of said lever of course moves this arm 130 and the connected arm 129 along the shaft, so as to carry the hooked end of lever 132 out of the path of lug $a$ and into the path of lug $c$, the reverse movement of the lever carrying it back again. The pin and slot connection of one end of the lever and the pin and groove connection of the other end thereof prevent any binding, and the feeding stroke effected by the said pawl 166 at each return movement of the slide 28 will carry the disk 163$^a$ and its crank pin half around, such stroke moving the said lever to the right or left according to the position of the said crank pin to the right or left of the center of said disk. As these positions alternate with successive strokes of said pawl 166, the said lever causes a succession of reciprocations along shaft 108 of the arms carrying rod 131 and three armed dog e, the same corresponding to the interval between lugs a and c in the direction of the length of such shaft and synchronizing with the return motions of the blank carrier 29 and slide 28. The same action may take place by giving the pawl and lever only throw sufficient to move the hooked arm 132 from the path of lug a to that of lug b and back again, the chisel-operating cam being given two projections or lugs, instead of the one that is shown in Fig. 4ª, and of course making the indentations or chisel cuts twice as often, and producing twice as many teeth to the row with only half as great intervals between the individual teeth thereof. These automatic alternating devices may be disconnected or removed if the corresponding teeth of proximate rows are to be side by side and not arranged alternately.

The general operation of the machine is as follows, assuming that a flat file blank is to be provided with straight parallel rows of teeth, each tooth in each row being opposite to the corresponding tooth in each of the others. The blank is first adjusted longitudinally by means described to the required position under the chisel, the shafts 108 and 106 are coupled; the clutch member 14 is put in contact with a cone 8 for feeding forward the governing slide 28ª and the blank carrier 29, and this forward travel continues until the end of the row is reached. The blank carrier is then shifted transversely by the screw-shaft 32, acting on the cross-slide 31, the chisel and pressure finger being removed from the blank to permit such action; and the double cone 14 is shifted into contact with cone 9, for returning the blank carrier and governing slide to their first longitudinal position. This reciprocating movement of the said governing slide and blank carrier continues until the file teeth have all been cut on the blank, whereupon these parts are restored transversely as well as longitudinally to their original position.

If a convex blank is to be cut; or teeth rows of irregular form are desired; or the teeth of one row are to be arranged alternately with respect to those of the next row, or the intervals between the teeth in a row are to be varied, or the depth of cut and form of the teeth due to the inclination of the tool is to be changed, the adjusting or regulating devices adapted to the particular purpose in question are made use of as before described in addition to the above stated general operation of the machine. Very often several of these especial provisions will be needed. Also where hand-operated and automatic actuating devices are set forth as alternatively available for attaining a particular result one or the other of these combinations and arrangements will be used instead of the other, according to the operator's choice or the requirements of the work.

The details of the several operations above referred to have been already explained in describing the several parts of the mechanism. To avoid repetition and prolixity, they are not set forth here, except in general terms.

Of course the mechanism herein described may be used for making rasps and other abrading devices as well as files proper, the difference being chiefly in the shape and size of the teeth or abrading prominences. The words of the claim "in a file making machine" and "for a file making machine" are not to be understood as limiting the combinations defined to the making of files proper nor as importing into said combinations the various elements of the machine other than those mentioned in said claims or necessarily implied thereby.

Having thus described my invention, what I claim as new and desire to secure by Letters Patent is:

1. In a file cutting machine, a longitudinally movable blank carrier and a cross slide on which it is mounted to slide therewith, in combination with a screw shaft arranged to move said carrier and cross-slide transversely, means for automatically rotating said screw-shaft to cause such transverse motion, and a longitudinally reciprocating slide 28 adapted to engage and actuate the said means only just before the said carrier and cross-slide reach the forward limit of their longitudinal movement substantially as set forth.

2. In a file cutting machine, a longitudinally movable blank carrier and cross-slide on which it is mounted to slide therewith, a transverse screw-shaft 32 and nuts engaging therewith arranged to operate said carrier and cross-slide, a ratchet wheel turning with said screw-shaft, a lever carrying a pawl which engages said ratchet, means for adjusting the throw of said lever at will and means for automatically operating said lever at one point of the longitudinal travel of said carrier and slide to cause the step by step transverse feeding of these two last named parts substantially as set forth.

3. In a file cutting machine, a blank carrier, in combination with a cross-slide on which said carrier is mounted to slide therewith transversely of the machine, a pair of nuts fitting the sides of said slide but allowing limited play of the latter between them, a transverse screw-shaft engaging the said nuts for laterally feeding said cross-slide and carrier, resilient means for cushioning the lateral movement of said slide and means for automatically turning said screw-shaft with a step by step motion as said carrier and cross slide travel forward longitudinally.

4. In a file cutting machine, a blank carrier, in combination with a cross-slide on which it is mounted to slide therewith, a transverse screw-threaded shaft arranged and adapted to feed said cross-slide and blank carrier automatically, means for turning said screw-shaft at intervals, a pattern bar for turning the same and a part interposed between said pattern bar and slide and held against said pattern bar under resilient pressure substantially as set forth.

5. In a file-cutting machine, a longitudinally movable blank carrier 29 and the cross-slide 31 on which it is mounted to slide therewith, in combination with a screw-shaft adapted to move said slide and carrier transversely, a ratchet wheel 39 fast on said screw-shaft, a pawl engaging said ratchet wheel, a lever 40 on which the said pawl is pivotally mounted, a weighted replacing chain or cord drawing on said lever, a stop for limiting the consequent pivotal movement of the latter, a slide 28, carrying a projection arranged to engage the said lever, and means for reciprocating the said slide 28 and the said blank-carrier 29 together longitudinally of the machine, the parts being constructed and arranged for such action of such projection only when the blank-carrier approaches the end of its forward movement and such action, overcoming the pull of said weighted chain serving to turn said screw-shaft to the extent of one tooth of said ratchet wheel substantially as and for the purpose set forth.

6. In a file-cutting machine, the combination of a transverse screw-shaft 32 with a ratchet wheel 39 fast thereon, a pawl engaging the same, a lever carrying the said pawl, a cross-slide moved transversely of the machine by said screw, as the latter is turned by said lever, pawl and ratchet, a longitudinally movable blank-carrier mounted on said slide, to slide therewith, a projection moving longitudinally with said slide and carrier and arranged for operative contact with said lever as said blank-carrier ends its forward movement longitudinally of the machine, means for effecting said longitudinal movement, means for replacing said lever in its former position after the passage of said projection, a stop for limiting the movement of said lever, an independently movable pinion which carries said stop, and an adjusting rack, meshing with said pinion for regulating the position of said stop, the said rack being adapted to be locked in any such position of adjustment and the said projection being correspondingly adjustable substantially as and for the purpose set forth.

7. In a file-cutting machine, the combination of a transverse screw-shaft 32 with a cross-slide engaged and operated thereby, a longitudinally movable blank-carrier mounted on said slide, to slide therewith, a slide movable longitudinally of the machine with the said cross-slide and blank-carrier and provided with an adjustable lateral projection, a lever, pawl and ratchet for turning the said cross-shaft 32, a stop for limiting the movement of the said lever, means for adjusting the said stop in accordance with the adjustment of the said projection, means for moving said slides and carrier longitudinally, and means for returning the said lever 40 to its first position, the said projection being arranged to strike and operate the said lever when the said slide and carrier are about to end their forward longitudinal movement substantially as and for the purpose set forth.

8. In a file-cutting machine, a longitudinally movable blank carrier and a cross-slide in which it is mounted, to slide therewith, in combination with a tubular screw-shaft 32 for transversely feeding the said slide, a rod movable endwise through the said shaft, a handle connected to said shaft for turning it and also arranged to move the said rod endwise therein, a disk carried by the said rod, a part adapted to be moved thereby and a ratchet wheel, pawl and lever for turning the said screw, the said disk being arranged to move the said part against the said pawl in such manner as to free the said ratchet therefrom at will, to permit the return of the said slide transversely to its first position at will substantially as set forth.

9. In a file-cutting machine, the combination of a longitudinally movable blank-carrier and a cross-slide on which it is mounted, to slide therewith, with nuts 34 and 35 arranged at opposite sides of said slide and carrier, the said nut 34 being spring-pressed outwardly, a rotatable transverse screw-shaft engaging the said nuts, a pattern bar 64 movable transversely with said slide, and acting on the nut 35 to move it and the said slide laterally in the reverse direction to the feed of said screw and means for rotating the said pattern bar to control the pattern of the rows of teeth of the file substantially as set forth.

10. In a file-cutting machine, a blank carrier, a governing slide and means for moving them longitudinally, a cutting tool, a lever carrying the same, a cam arranged to actuate said tool and lever, means for rotating the said cam, a shaft on which the said lever is mounted, a templet carried by the governing slide and arranged for contact with an arm of said shaft to vary the position of the fulcrum of the said bell-crank lever and the action of the said cutting tool as desired, during the longitudinal movement of said blank-carrier and slide substantially as set forth.

11. In a file-cutting machine, the combination of a cutting tool and its stock with a bell-crank lever, a transverse crank-shaft 78 having a tubular crank 78ª, a shaft journaled eccentrically in said crank (which crank constitutes the fulcrum for said lever), a rod connected at one end to said shaft and at the other to said stock, and a spring acting on said stock against the pull of the said rod, and thereby holding the tool in operative position but yielding under pressure of the material to permit a certain amount of play of the said tool in one direction independent of the said lever, the connection between said rod and stock being such as not to obstruct the same substantially as set forth.

12. In a file-cutting machine, the combination of a tool and tool-stock with a lever on which the said stock is pivoted, a crank shaft having a tubular crank which is the fulcrum of said lever, a shaft passed eccentrically through the said crank, a rod connected at one end to the stock in such manner as to allow its own rotary movement and the limited pivotal play of said stock and at the other end provided with a bifurcated head engaging pins on the ends of the said shaft, a movable rack, a templet engaging said rack to move it longitudinally according to the shape of said templet during the travel of the latter, gearing from said rack to said shaft, a traveling blank-carrier, a slide carrying said templet, mechanism for operating the said slide, the said rack and the said devices thereby driven serving to vary automatically the position of the tool according to the predetermined pattern of the templet substantially as set forth.

13. In a file-cutting machine, the pressure finger 104 adapted to bear on the blank, in combination with a shaft-arm 105 constituting the pressure finger holder, the hollow shaft 106 carrying the said arm and finger, the shaft 108 entering at one end the former and clutched thereto, a spring operating to turn the same and a shifting clutch for gearing together the said shafts and ungearing them at will substantially as set forth.

14. In a file-cutting machine, the springs 117 and 126, arranged and adapted to be held in tension while the chisel is working, in combination with shafts, 7, 108 and 20, a hub 108ª on shaft 108 having arms 114, 119 and 120, connections from arm 114 to spring 117 and from the latter to an arm 118 on shaft 20, a reversing clutch on shaft 7, mechanism between shafts 20 and 7 for shifting the said clutch, the tool, tool-stock and tool-holding lever, a rotary cam 83, acting to hold the said lever out of operating position and a chain or cord connecting spring 126 and arm 120 substantially as set forth.

15. In a file-cutting machine, the combination of shaft 108 with hub 127, having projecting lugs arranged at both longitudinal and axial intervals, a dog movable along said shaft with its splined supports for shifting its engaging arm from the path of one of said lugs to the path of another, such engagement in either instance causing the said hub and shaft 108 to turn together, the chisel-carrying lever, the pressure-finger holder, the clutch for reversing the feeding operation of the machine and sets of devices transferring the motion of said hub to the last three parts above named for the purposes set forth.

16. In a file-cutting machine, the combination of shaft 108 with a hub 127 turning thereon and having projecting lugs, a dog mounted pivotally on a support carried by shaft 108 and tending normally to engage one of said lugs, locking said shaft and hub to turn together, means automatically and periodically engaging said dog to free it from such engagement, a driving shaft geared to said hub, the tool, the pressure-finger, the feed-reversing clutch member 14 and sets of devices connecting shaft 108 to the three last named parts, for the purpose set forth.

17. In a file-cutting machine, a shaft 108, in combination with a hub 127 turning thereon and having a projecting lug, a pivoted dog carried by supports turning with said shaft and tending to engage said lug, a driving shaft geared to said hub, a device arranged to periodically disengage the said dog from said lug, devices transferring motion from said hub, the tool, the pressure finger, the feed reversing clutch, sets of devices transferring motion from shaft 108 to the three parts last named, and a device normally holding said dog out of operative position substantially as set forth.

18. In a file-cutting machine, a shaft 108, in combination with a hub 127 turning thereon and provided with a projecting lug, a pivoted dog, tending normally to engage the said lug and carried by supports turning with said shaft, in order that the shaft and hub may turn together, a driving shaft geared to said hub, the cutting tool, the pressure finger, the feed reversing clutch, sets of devices transmitting the motion of shaft 108 to the last three parts and a movable device normally tending to hold said dog out of engagement substantially as set forth.

19. In a file-cutting machine, a shaft 108, in combination with a hub 127, turning thereon and provided with projecting lugs arranged thereon at predetermined longitudinal and circumferential intervals, a pivoted three armed dog normally tending to drop its arm 132 into the path of one of said lugs, supports for said dog splined on the said shaft, means for moving said supports along the said shaft for shifting said arm from the path of one lug to that of another, a driving shaft geared to said hub, a stop engaging at intervals another arm of said dog to lift arm 132 out of engagement and free the said shaft from rotation with said hub, the reversing clutch of the devices for feeding the blank, the parts which come in contact with said blank during file-cutting, and mechanism transferring the motion of shaft 108 to the said clutch and last mentioned parts, for the purpose set forth.

20. In a file-cutting machine, a shaft 108 and a hub 127 turning thereon, in combination with the feed-reversing clutch, the tool, the pressure finger, sets of mechanism connecting said shaft with these three parts, a driving shaft geared to said hub, a dog normally and automatically locking the said hub and shaft to turn together, a device tending to hold said dog out of engagement and means for automatically and periodically freeing the said device from the said dog substantially as and for the purpose set forth.

21. In a file-cutting machine, a shaft 108 and a hub 127 turning thereon, in combination with the feed-reversing clutch, the tool, the pressure-finger, sets of mechanism connecting said shaft with these three parts, a driving shaft geared to said hub, a device normally and automatically locking the said hub and shaft to turn together, a spring-pressed support tending to hold the said device in such engagement, means for normally preventing the spring from being overcome and the support moved out of contact, and devices for overcoming this resistance automatically and periodically and withdrawing said support to leave the said dog free from its shaft coupling action aforesaid substantially as set forth.

22. In a file-cutting machine, the combination of shaft 108 and hub 127 free to turn thereon, and provided with projecting lugs at circumferential and longitudinal intervals, with a three armed dog carried by supports splined on said shaft and normally engaging one of said lugs to lock said shaft and hub for turning together, a driving shaft geared to said hub, blank-feeding and blank-treating devices operated by shaft 108, a shifting lever 162, connections between this lever and one of said supports, a ratchet wheel, connections between said wheel and said lever, a governing slide moving with the file blank longitudinally of the machine and a pawl carried by said slide and arranged to engage said ratchet wheel at each return movement of the said slide, the said parts being arranged so that each two impulses given by said pawl to said ratchet wheel will shift the said dog from the path of one of said lugs to the path of the other and back again substantially as set forth.

23. In a file-cutting machine, the combination of shaft 7 with the main shaft 1, belts whereby shaft 7 is driven in either direction therefrom the reversing clutch on shaft 7, the blank feeding and withdrawing mechanism operated by this shaft, an arm shifting said clutch, a shaft 20 carrying this arm, another arm 149 also carried by the latter shaft, a rod 151 connected with this latter arm, a spring 152 acting on said rod to hold said gear in position for the return movement of the blank, the spring 107 and connections, and means for automatically uncoupling the shafts 106 and 108 from each other, the blank being thereby freed from the tool and pressure-finger to permit such return movement substantially as set forth.

24. In a file-cutting machine, a governing slide 28 having lateral projections or lugs 147 and 154 and means for reciprocating the said slide, in combination with a rotary hub having a rib 148, arranged to be engaged and turned by projection 147 as the said slide moves backward, a shifting lever 111, arranged to be operated by said rib as the said hub is thus turned, a clutch shifted by this movement of said lever, shafts 108 and 106 uncoupled by such shifting of said clutch, a pressure-finger holder connected to and turning with the said shaft 106, a friction coupling by which the tool is driven, a series of devices operated by lug 154 for freeing said coupling, and devices for intermittently rotating shaft 108, the above described action of the governing slide and its two lugs freeing the blank from all cutting and holding devices substantially as and for the purpose set forth.

25. The combination of the tool and tool stock of a file cutting or rasp cutting machine with a lever, on which the said stock is pivoted, a rotary cam acting on said lever to operate said tool, another cam acting on said lever to hold it out of reach of the former cam, means tending to turn the latter cam for that purpose and additional means, controllable at will, for preventing the restraining action of the latter cam on said lever substantially as set forth.

In testimony whereof I have affixed my signature in presence of two witnesses.

GOTTLIEB PEISELER.

Witnesses:
 WOLDEMAR HAUPT,
 WILLIAM MAYNER.